United States Patent
Axelrod

[19]

[11] Patent Number: 6,131,534
[45] Date of Patent: Oct. 17, 2000

[54] PET CARRIER

[75] Inventor: Glen S. Axelrod, Neptune City, N.J.

[73] Assignee: TFH Publications, Inc., Neptune City, N.J.

[21] Appl. No.: 09/334,529

[22] Filed: Jun. 16, 1999

Related U.S. Application Data

[63] Continuation-in-part of application No. 09/266,389, Mar. 11, 1999, abandoned.

[51] Int. Cl.$^7$ ........................................................ A01K 1/03
[52] U.S. Cl. ........................................... 119/499; 119/497
[58] Field of Search .................................. 119/453, 474, 119/479, 480, 482, 497, 498, 499, 500, 501, 461, 166, 169, 431, 432, 462, 463, 496

[56] References Cited

U.S. PATENT DOCUMENTS

| | | | |
|---|---|---|---|
| 2,524,229 | 10/1950 | Krueger | 119/479 |
| 3,048,147 | 8/1962 | McKean | 119/496 |
| 3,195,506 | 7/1965 | Beard | 119/496 |
| 3,284,273 | 11/1966 | Prentice | 119/169 |
| 4,181,612 | 1/1980 | Trail | 210/169 |
| 4,487,540 | 12/1984 | Yamamoto | 119/19 |
| 4,649,578 | 3/1987 | Vargo | 119/161 |
| 4,838,204 | 6/1989 | Young | 119/471 |
| 4,869,206 | 9/1989 | Spina | 119/417 |
| 5,000,121 | 3/1991 | Daily | 119/461 |
| 5,038,721 | 8/1991 | Quellette et al. | 119/167 |
| 5,133,294 | 7/1992 | Reid | 119/96 |
| 5,148,771 | 9/1992 | Schuett et al. | 119/479 |
| 5,184,574 | 2/1993 | Kirk et al. | 119/162 |
| 5,503,107 | 4/1996 | Satcher et al. | 119/19 |
| 5,549,073 | 8/1996 | Askins et al. | 119/474 |
| 5,669,331 | 9/1997 | Richmond | 119/497 |
| 5,671,698 | 9/1997 | Farrugia | 119/497 |
| 5,715,772 | 2/1998 | Kamrath et al. | 119/169 |
| 5,769,028 | 6/1998 | Deckys | 119/496 |
| 5,803,018 | 9/1998 | Liou | 119/461 |
| 5,839,392 | 11/1998 | Pemberton et al. | 119/498 |
| 5,967,090 | 10/1999 | Hui | 119/497 |

FOREIGN PATENT DOCUMENTS

| | | | |
|---|---|---|---|
| 2388491 | 11/1978 | France | 119/496 |
| 1427201 | 3/1976 | United Kingdom | 119/480 |

OTHER PUBLICATIONS

R.C. Steele Wholesale Pet Supply Catalog, Brockport, New York, "Doskocil Kennels", pp. 3 & 18.

*Primary Examiner*—Michael J. Carone
*Assistant Examiner*—Son T. Nguyen
*Attorney, Agent, or Firm*—Hayes, Soloway, Hennessey, Grossman & Hage, P.C.

[57] ABSTRACT

A pet carrier/portable habitat structure for containing a pet comprising a bottom panel containing a floor surface sloped downwardly and inwardly to a recessed section in the floor surface. The habitat also includes a perforated tray removably placed within the bottom panel, including a top panel, first and second side panels, a first end panel and a second end panel. The first end panel and second end panel are hingedly attached to the habitat to collapse inwardly into the habitat, and the first and second side panels are hingedly attached to the top and bottom panels. The first and second side panels each comprise upper and lower sections hingedly connected to one another so as to collapse the first and second side panels inwardly into the habitat. The perforated removable tray contains openings to allow for passage of liquid into the bottom panel, and include supports positioned between the tray and the bottom panel to maintain the tray above the floor surface of said bottom section.

9 Claims, 6 Drawing Sheets

PET CARRIER

CROSS-REFERENCE TO RELATED APPLICATIONS

This application is a continuation-in-part of U.S. application Ser. No. 09/266,389, filed Mar. 11, 1999, now abandoned.

FIELD OF INVENTION

This invention relates in general to a pet carrier transportation device and in particular to a collapsible/foldable pet carrier or portable structure that absorbs or isolates liquid waste that may be present in the carrier and which carrier design further provides a more sanitary condition for the pet when in transport.

BACKGROUND OF THE INVENTION

A variety of pet carriers have been reported in the prior art, all aimed in one form or another to facilitate pet transportation. Specifically, pet carriers are commonly used by pet owners for carrying their pets on trips or as a means for containing the pets when the pets are shipped from one point to another. Pet carriers also commonly double as sleeping quarters for the pet as the owner may contain the pet overnight to prevent the pet from wandering and potentially damaging the home or hotel room in which the owner is occupying.

There are, however, some shortcomings inherent to common pet carriers. During transport, the pet will require food and water and periodically will need to relieve its bodily functions. In addition, the food and water itself, which are placed in the pet carrier, may be overturned by the pet or by carrier movement during transportation. Accordingly, in either case, the pet carriers to date have been inadequate in their ability to efficiently deal with such problems and to provide the pet with a stable hygienic environment.

For example, some common pet carriers currently available have been advertised in the "R. C. Steele Wholesale Pet Supply Catalog", Brockport, N.Y., which illustrates "Doskocil Kennels" as a lightweight, portable kennel designed for safe transportation. Also shown is the "Vari-Kennel" design that contains what is described as a "dial latch system" for ease of assembly. However, neither of these designs display any aspect of how to preserve a sanitary condition in the specific carrier should the animal be forced to relieve itself.

More specifically, reviewing the patent literature begins with U.S. Pat. No. 5,769,028, entitled "Pet Carrier" which discloses a carrier including a main unit and an insert unit. The main unit defines a carrying space having a closed bottom and four sides, one of which has an opening therethrough large enough to permit an animal to enter the space through the opening, and the insert unit has a closed top, four sides, and an open bottom. After the animal has entered the main unit, the insert unit is lowered down into the main unit to close off the side opening. Then a foldable top closure for the main unit is folded to secure the carrier and form a handle structure for carrying the carrier. Both units are foldable and are structured to provide an enhanced strength carrier.

U.S. Pat. No. 5,503,107 entitled "Pet Carrier" discloses a container for manually transporting a pet having a litter box, food container and water container therein and sliding doors accessible from the exterior of the container for selectively closing the litter box, food container and water container to prevent inadvertent spillage. The container may also include a single compartment or two detachably connected compartments in order that a liter box compartment may be selectively separated from a food and water compartment. Detachable handles are provided in order that each separate compartment of the dual compartment embodiment may be carried separately or as a unified compartment.

U.S. Pat. No. 5,839,392, entitled "Pet Carrier" discloses a corrugated plastic pet carrier with two side panels. A side panel fold line extends between the base panel and each side panel. In addition, a diagonal fold line is said to extend from each comer of the base panel to a first median fold line for collapsing the base panel, side panels and end panels inwardly for collapsing the container from an erect position to a collapsed, generally flat position, and back to an erect position.

U.S. Pat. No. 5,671,698 entitled "Pet Carrier" discloses a pet housing having a rigid bottom panel enclosed in a bottom cover which is attached to a plastic mesh which is shaped to form the pet carrier sides and top. The plastic mesh is attached to inverted U shaped rigid frame members which hold the shape of the sides and top as well as provide structural support to protect the pet being transported. The pet carrier has a rear end panel and door of plastic mesh to complete the enclosure. There is a provision for a tray and absorbent pad in the bottom of the pet carrier for hygiene as well as a cover to protect the pet from the environment.

U.S. Pat. No. 5,133,294, entitled "Pet Carrier for Vehicles" discloses a pet carrier for use in a vehicle comprising a platform sized to generally fit on the passenger seat. Front, rear and side panels are pivotally connected to the platform for movement between generally horizontal positions and upright positions wherein they form a pet enclosure upstanding from the platform.

Finally, attention is directed to U.S. Pat. No. 5,715,772 entitled "Pet Carrier Absorbent Pad" which discloses an absorbent pad designed to be used with pet carriers to absorb liquids that may be present. Specifically, the pad is said to contain an absorbent layer having first and second sides, a first single direction moisture conveyor positioned proximate to at least one side of the absorbent layer for allowing moisture to pass toward the absorbent layer and for resisting passage of moisture out of said absorbent layer. A second single direction moisture conveyor is positioned proximate to said second side of said absorbent layer, wherein the first and second direction moisture conveyors are oriented about said absorbent layer so that moisture travels across said moisture conveyors only toward said absorbent layer.

As can be seen from the above review of the art, although certain pet carrier designs have been disclosed which are collapsible, and although absorbent pads of certain construction are known, there remains an on-going demand for a pet carrier design which more efficiently deals with liquid waste build-up, and which also collapses into a substantially flat configuration for ease of storage/transportation when not in use. Stated another way, pet carriers to date have shown themselves to be relatively bulky and heavy thereby failing to provide a simple, lightweight and portable pet carrier which provides both comfort and good hygiene for the pet, and also provides a safe/sturdy structure for protection during transport.

Accordingly, it is a general object of this invention to provide a pet carrier that is conveniently collapsible for storage, and which provides both the pet and the pet owner with a advantageous method to deal with the liquid animal waste that will occur in the carrier over extended periods of time.

More specifically, it is also an object of this invention to provide a pet carrier design that allows for ease of cleaning of animal waste, and which isolates the animal from the liquid waste when the pet is forced to remain in the carrier after relieving itself.

Finally, it is also an object of this invention to provide a more humane method of transporting pets. That is, it is an object of the invention herein to provide a pet carrier construction wherein the pet can be provided with essential liquid nourishment when in transport without fear of the pet becoming exposed to unsanitary and unhealthy conditions due to the evolution of a soiled environment.

SUMMARY OF THE INVENTION

A pet carrier/portable structure for containing a pet comprising a bottom panel, a tray placed within said bottom panel which tray is removable therefrom, including a top panel, a left panel, a right panel and a first end panel and a second end panel. The first and second end panel are releasably engaged to said carrier and the left and right panels each comprise an upper and lower section hingedly connected to one another so as to collapse the left and right panels inwardly into said pet carrier. The tray further comprises screen material which screen material allows for passage of liquid into said tray and which screen material also supports the pet above said liquid.

DETAILED DESCRIPTION OF PREFERRED EMBODIMENTS

Figure 1:
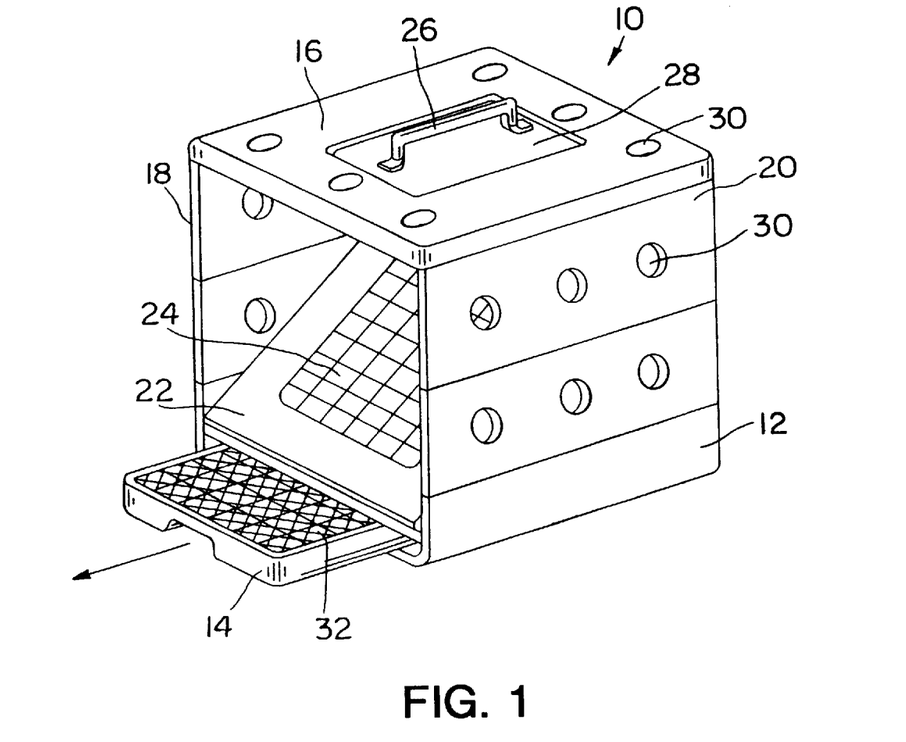
FIG. 1 illustrates a perspective view of one preferred embodiment pet carrier/portable structure design.

A preferred pet carrier/portable structure design in accordance with the present invention is illustrated in FIG. 1. As shown therein, the pet carrier 10 contains a bottom panel 12 and tray 14 removably placed on the bottom panel, a top panel 16, a left panel 18, a right panel 20 and a first end panel 22 containing a screen door section 24. In addition, the carrier contains a folding handle 26 which rests within recess 28. Also shown about the carrier 10 are air holes 30. As shown in FIG. 1, the first end panel 22 is hingedly attached to bottom panel 12 so that end panel 22 can be readily made to collapse inwardly into carrier 10. In a similar manner, carrier 10 also preferably contains a second end panel (not shown) at the rear of the carrier that is also hingedly attached to the bottom panel 12 so that it too can be made to collapse inwardly into the carrier 10 when the carrier 10 is not in use.

Figure 2:
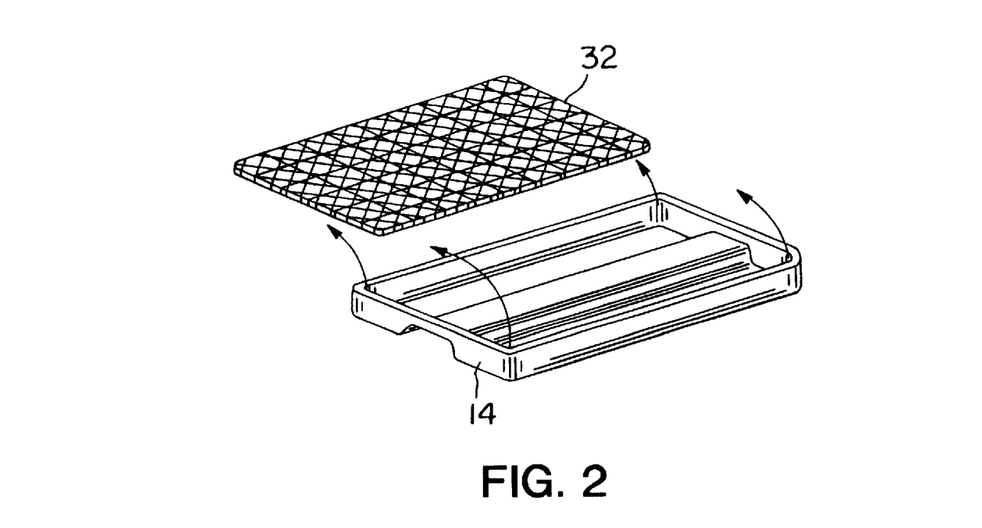
FIG. 2 illustrates a perspective view of the pet carrier removable tray.

With attention directed at both FIGS. 1 and 2, the tray 14 is shown to have a screen material 32 which screen material preferably rests on top of the tray 14. The screen material 32 therefore conveniently allows for passage of liquid into the tray but also simultaneously supports the pet above any liquid passing into tray 14, thereby providing an improved sanitary condition for the pet over extended periods of time.

In that regard, screen 32 is preferably constructed from a double layer of screen material. That is, screen 32 preferably contains a top layer of fine mesh/screen material to allow for both fluid passage while preventing a paw or nail of the animal from falling therethrough and becoming dangerously affixed to said mesh/screen material. Accordingly, such upper layer of mesh/screen material is preferably made close enough in opening to be comfortable for the animal to walk upon when the animal is placed within the carrier. This upper layer of fine mesh is then placed upon a lower structural grid screen which is therein designed to support the animal's weight. With respect to this preferred use of a double layer of screen material, it has been found that the top layer is preferably of mesh size or sieve size No. 400 to about 0.25 (nominal opening of 0.0015 to 0.250 inch as noted in the "Handbook of Chemistry and Physics CRC, $58^{th}$ Edition, Standard Test Sieves-Wire Cloth") and can be made from plastic or metallic type screen/mesh material. At such screen/mesh size, and as noted, the mesh will conveniently allow for passage of liquids, which of course include liquids spilled by the animal and/or liquid waste produced by the animal if forced to urinate in the carrier. The lower structural layer can then be readily fabricated from larger and heavier mesh/screen size material, such as, e.g., mesh size of greater than about 0.25 inch to, e.g., 5 inch, which corresponds to a nominal opening of 0.25 inch to 5 inches. The lower structural layer has as its purpose to support the load of the animal, while again, allowing for fluid passage.

Alternatively, those skilled in the art will appreciate that screen 32 can be made of a simple monolayer type screen/mesh construction, which monolayer similarly achieves the goal of allowing for fluid passage and acts to prevent a paw or nail from falling through and becoming lodged therein, which could cause injury to the animal. However, if monolayer construction is the choice, the monolayer itself must be made sufficiently strong/rigid to support the animal's weight contained therein. In that regard, it has been found suitable to use a monolayer type screen/mesh material of a mesh size for positioning on tray 14 so that tray 14 acts to collect liquid or liquid waste and simultaneously supports the animal above such captured liquids. In that regard, the mesh size can again be preferably made in the range of mesh size No. 400 to 0.25. However, this is only a preferred range, and as noted above, the selection of mesh size is done to accommodate passage of fluids and to prevent injury to the animal by preventing the animal's paw or nail from becoming trapped.

Figure 3:
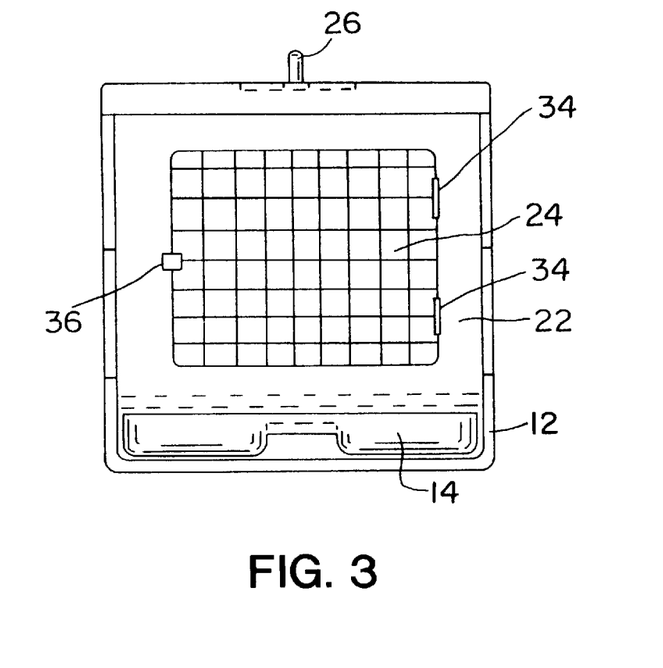
FIG. 3 illustrates a front perspective view of a preferred pet carrier design.

FIG. 3 shows a front perspective view of the carrier 10. As illustrated therein, the screen door section 24 is preferably hinged at 34 to the end panel 22 and also preferably contains a latch 36. As also shown in FIG. 3, the tray 14 rests in the bottom panel 12, and the folding handle is again shown at 26.

Figure 4:
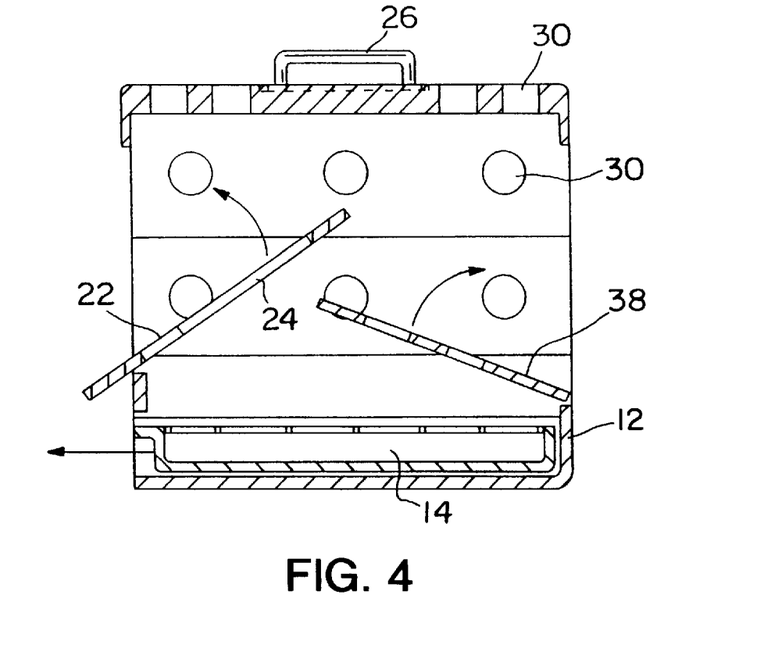
FIG. 4 illustrates a side perspective view of a preferred pet carrier design in partially collapsed configuration.

Attention is next directed to FIG. 4, which provides a side perspective view of a preferred pet carrier design in partially collapsed configuration. As seen therein, first end panel 22 containing screen door 24 is hingedly collapsed inwardly into the pet carrier. Similarly, second end panel 38 is hingedly collapsed into the pet carrier, which collapsing first end panel 22 and second end panel 38 initiates the folding of the carrier into a substantially flat construction for ease of storage. Also, as shown in this particular preferred embodiment, end panel 38 is hingedly connected to bottom panel 12.

However, while FIG. 4 illustrates the preferred configuration herein where the first end panel 22 and second end panel 38 are hingedly connected to the bottom panel 12, it will be appreciated that end panels 22 and 38 can simply be made so that they are releasably engaged to the pet carrier, e.g., by a mechanical attachment such as a snap-fit or wing-nuts with quick release. In that manner the end panels can be easily released/removed from the pet carrier and/or placed within the pet carrier for the purposes of shipping/storage.

Figure 5:
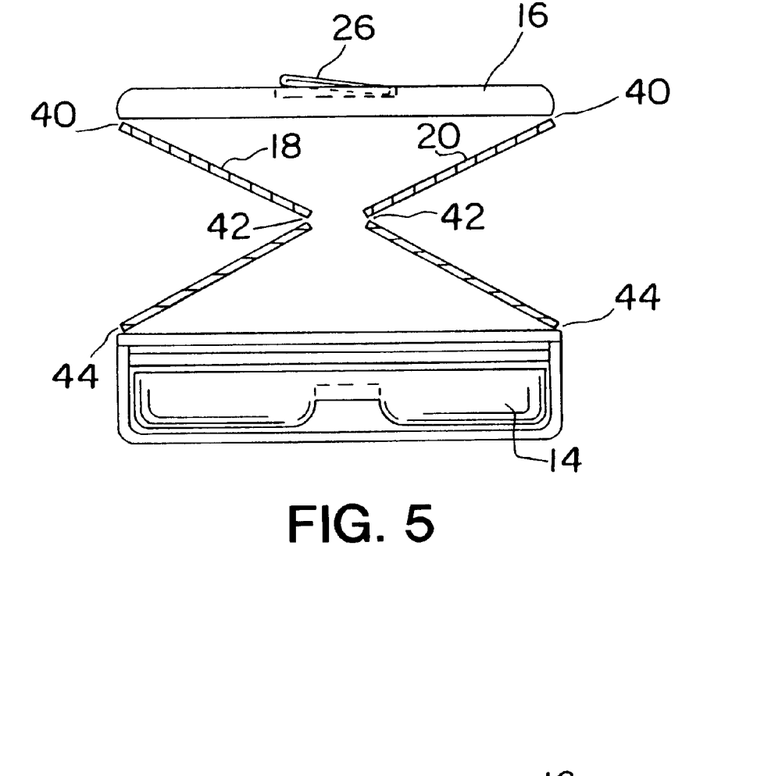
FIG. 5 illustrates a front perspective view of a preferred pet carrier design in partially collapsed configuration.
Figure 6:
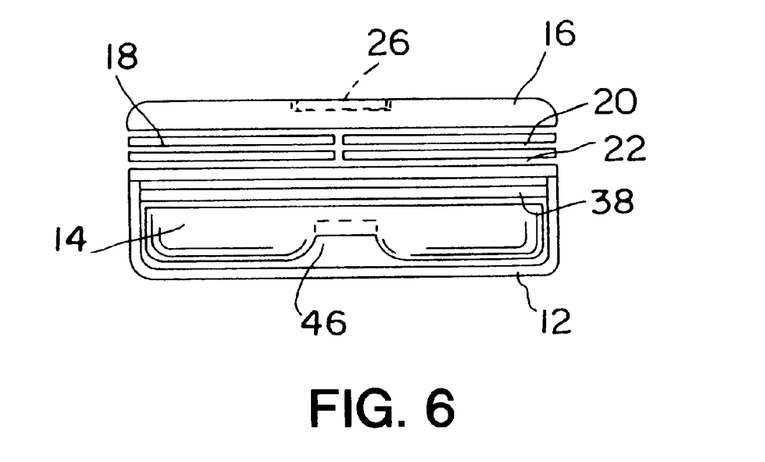
FIG. 6 illustrates a front perspective view of the preferred pet carrier design in a fully collapsed configuration.

FIG. 5 illustrates a front perspective view of a preferred pet carrier design in partially collapsed configuration. As shown therein, the panels 18 or 20 are both hingedly connected at 40 to top panel 16. In addition, a hinged connection is shown at 42 and a further hinge connection is placed at 44, which connection 44 connects the panels 18 and 20 to the bottom section 44. As shown in FIG. 5, such strategic placement of hinges 40, 42 and 44 allows for the panels 18 and 20 to collapse downwardly into a substantially flat collapsed configuration, as shown in FIG. 6. That is, with attention to FIG. 6, handle 26 is made to rest in a recess in the top panel 16, panels 18 and 20 are in a fully collapsed state, as well as panels 22 and 38. In this collapsed state, it can be seen that tray 14 still conveniently rests within bottom panel 14. Accordingly, it can be appreciated that in the collapsed state shown in FIG. 6, the pet carrier design herein can be conveniently stored or transported for further use.

Finally, with attention again directed at FIG. 5, as illustrated therein, hinge connections 40, 42 and 44 are arranged such that panels 18 and 20 collapse inwardly into the carrier. That being the case, the hinge 40 is preferably hinged so that the hinge itself is positioned on the inside surface of panels 18 and 20; i.e., the hinge is inside the carrier as shown in FIG. 5. Hinge connection 42, as also shown in FIG. 5, is itself positioned on the outside surface of panels 18 and 20, and finally, hinge 44 is preferably designed so that the hinge is connected to the inside surface of panels 18 and 20. Such positioning of the hinge connections 40, 42 and 44 thereby facilitate the collapse of the panels 18 and 20, downwardly, into the substantially flat configuration shown in FIG. 6.

In addition to the collapsing features noted above, attention is drawn to U.S. application Ser. No. 09/255,117 filed Feb. 22, 1999 entitled "Foldable Collapsible Structure", commonly owned by the assignee herein, and whose teachings are incorporated by reference. Specifically, as disclosed therein, a collapsible/foldable structure is disclosed comprising a top roof and a bottom platform defining a top and bottom of said structure; front and rear collapsible walls each pivotally attached to said bottom platform to provide for pivotable collapse of said front and rear walls; a pair of sidewalls each pivotally attached to said roof to facilitate inward collapse of said sidewalls when said sidewalls are pivoted toward said bottom platform, said sidewalls further containing an upper, middle and lower sections, wherein said upper and middle sections are pivotally attached to one another and said middle and lower section are also pivotally attached to one another so that said upper and middle sidewall sections can be pivoted inwardly towards said bottom platform; and wherein said top roof section further comprises two roof sections pivotally attached to one another at about the mid-point of said roof section, so that said two roof sections can collapse downwardly along said pivotable attachment toward said bottom platform.

Accordingly, in optional embodiment, the left panel 18 and right panel 20 as disclosed herein can be made to contain an upper, middle and lower sections, wherein said upper and middle sections are pivotally or hingedly attached to one another and said middle and lower section are also pivotally or hingedly attached to one another so that said upper and middle panel sections can be pivoted or hinged inwardly towards said bottom panel 12.

On that note, hinges 40, 42, and 44, as shown in FIG. 5, may comprise an add-on standard mechanical type plastic or metallic hinge construction, and can therefore be of sufficient number (running along the length of the structure) to effectuate the foldable/collapsible mechanism herein described. Alternatively, said hinges can also run the entire length of the structure, and be made of a polyolefin (polypropylene), which therefore provides living-hinge characteristics to the present invention. The living hinge can be either a non-integral feature of the panels (i.e. an add-on), or, in alternative embodiment, can be made integral to said panels, in which case the hinge would be contiguous with the outer surface of the panels 18 and 20.

Optionally, tray 14 can be made to contain an absorbent pad, for purposes of soaking up any liquid spilled by the animal, or liquid waste should the animal be forced to relieve itself when contained within the carrier. In addition, as illustrated in FIG. 6, the tray 12 also preferably contains a recess at 46 which conveniently provides a location for the consumer to hold onto the tray and remove the tray from the carrier for any necessary cleaning.

With regards to the preferred materials of construction, it is to be noted herein that the pet carrier panels are themselves preferably manufactured of panels made of a plastic outer layer with a polyurethane foam core. Such construction provides excellent thermal insulation, as well as lightweight and durability for ease of transport. The plastic outer layer, as previously noted above, can then be preferably made from a polyethylene or polypropylene resin, to thereby provide a flexible film outer layer for the purposes of forming the above noted hinge sections 40, 42 and 44. In that regard, a polypropylene film would provide the aforementioned living hinge structure while being integral to the outer plastic layer of the carrier panels.

Figure 7:
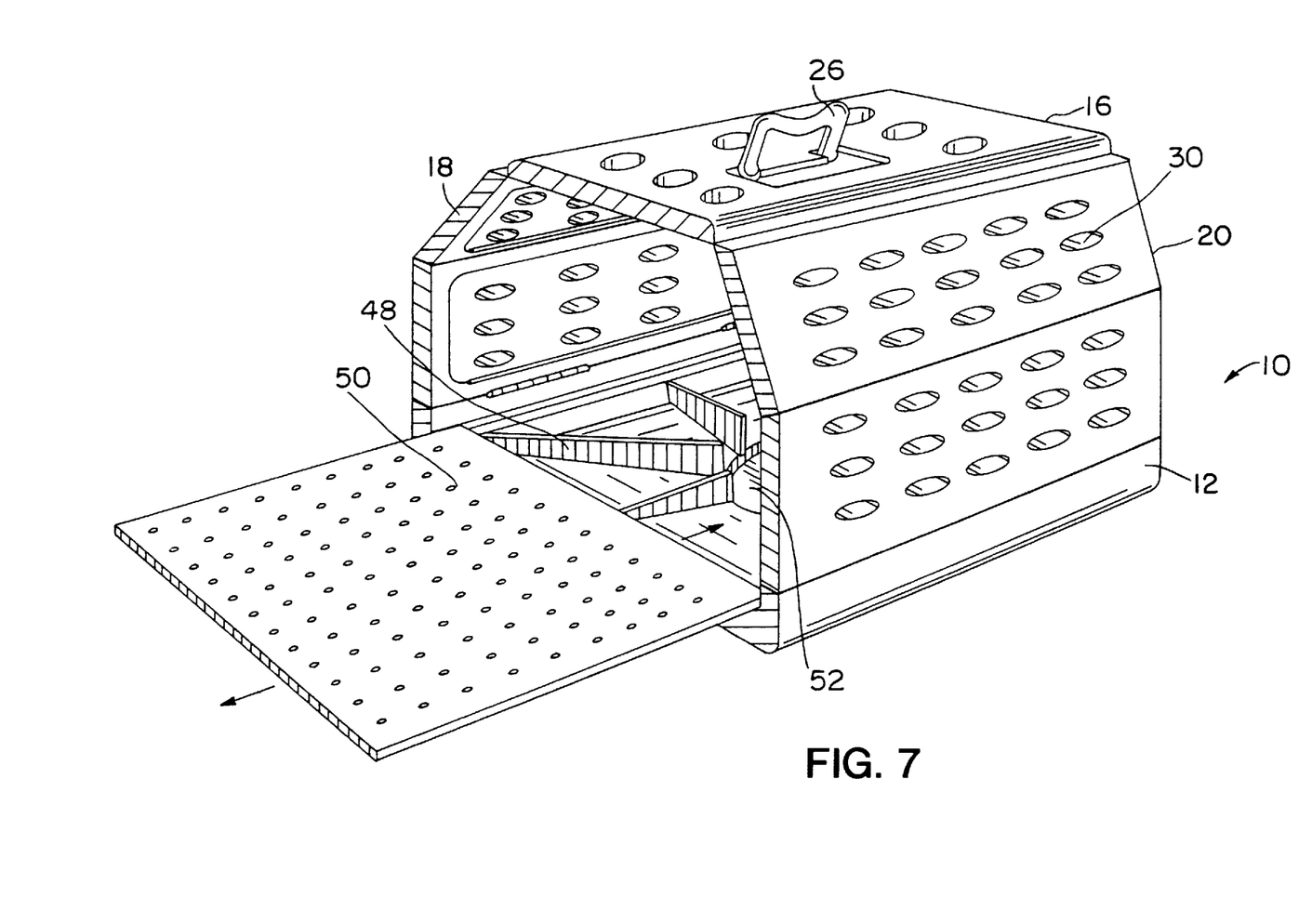
FIG. 7 illustrates yet another preferred embodiment of the present invention is which a perforated removable tray is supported by ribbed supports on the bottom of the pet carrier/portable habitat.

With regard to yet another preferred embodiment of the present invention, attention is directed to FIG. 7, which again illustrates the pet carrier/portable habitat 10 which bottom panel therein 12 contains support structures 48 attached thereto. In addition, a perforated removable tray 50, made of plastic, is shown and which is configured to rest upon support structures 48 at the bottom of the habitat 10. Optionally, the support structures can be part of the tray 50. In addition, the support structures 48 can be either integral with the bottom section, or a separate lift-out component.

Figure 8:
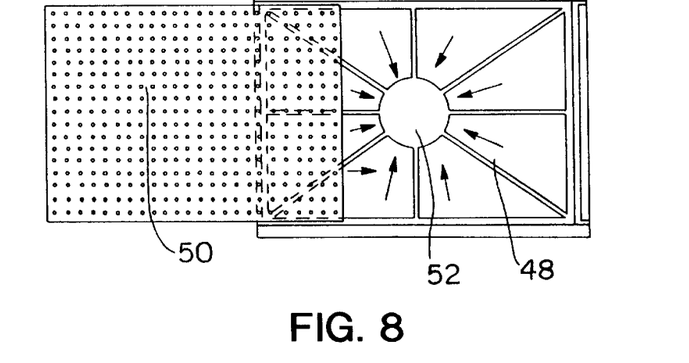
FIG. 8 provides a plan view of the pet carrier/portable habitat of FIG. 7.

As specifically shown, support structures 48 are preferably a ribbed design, of which a plurality preferably extend, as shown in FIG. 8, from the edge of the bottom section into the carrier and extend towards a circular recessed area 52 in the bottom section 12. The circular recessed area 52 thereby acts as a built-in collection location for any liquid waste produced by the animal. Accordingly, within the circular recessed area 52 it will be preferable at times to include an absorbent collection pad.

It is also to be noted that the various structural sections of the present invention, such as bottom section 12, as well as panels 16, 18 and 20, are preferably manufactured by a process of blow molding, which provides both an inner and outer wall structure (twin-wall construction) to the portable habitat herein. Such twin wall construction is best shown at 54 in FIG. 9, which illustrates a front sectional view of the portable habitat. In that regard, such blow molded wall construction provides a much safer environment for the pet, as any impact against the outer wall will be better absorbed in such blow molded wall construction as opposed to a single type wall configuration. In addition, such inner and outer wall construction conveniently allows for the optional use of insulating foam material, which would provide better regulation and temperature control inside the portable habitat when in transit, or exposed to severe temperature fluctuations.

Figure 9:
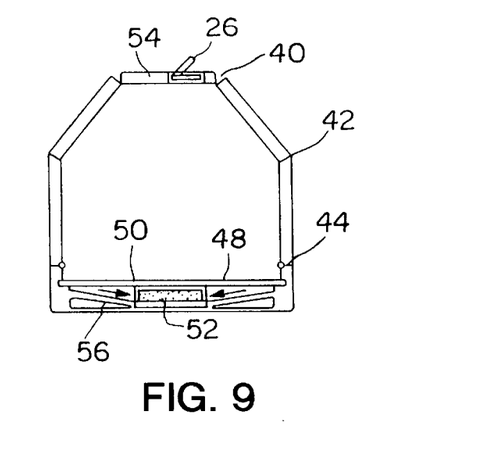
FIGS. 9 and 10 provide alternative front sectional view of the pet carrier/portable habitat of FIG. 7.

Also shown in FIG. 9 is the folding handle 26, and hinges 40, 42 and 44, which as previously noted, can assume either a mechanical or living-type membrane hinge configuration. For example, in a particular preferred design, hinges 40 and 42 are both of the living type or membrane hinge type variety, and hinge 44 can be a mechanical or piano type hinge design. Also better illustrated in FIG. 9 is the feature that the bottom section 12 contains a downwardly sloping surface 56 which again facilitates the flow of waste fluid toward the circular recessed area 52 which as illustrated in FIG. 9 to contain an absorbent pad. Finally, the removable tray 50 is shown in cross-section along with the general location of the ribbed supports 48.

Figure 10:
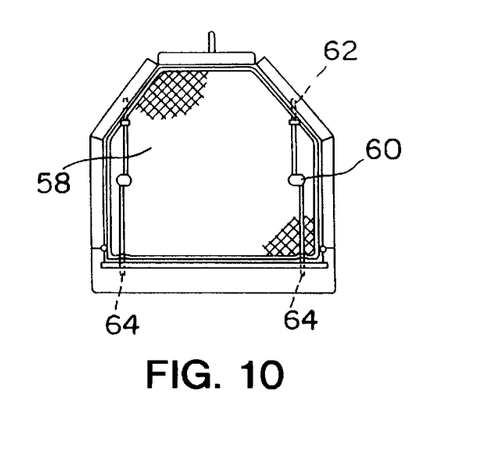
Figure 11:
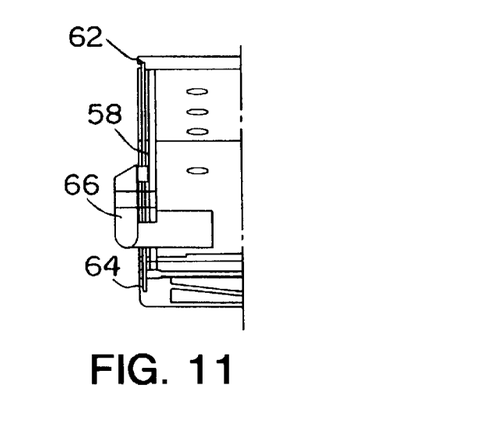
FIG. 11 provides a more detailed side sectional view of the front door section of the pet carrier/portable habitat.

Attention is next directed to FIG. 10, which is yet another front sectional view of the portable habitat, illustrating the use of a preferred metallic/chrome wire door 58. In addition, as further illustrated in FIG. 10, the door 58 contains a spring loaded pin release 60 along with pins at 62 and 64, thereby releasably engaging door 58 to the portable habitat structure at either a left or right location. With attention directed at FIG. 11, a more detailed sectional view is provided of the pins 62 and 64. It is therefore worth noting that by making the door 58 entirely releasable from the habitat, different doors can be employed which are more suitable for the particular animal at issue. For example, in the case of a bird, a small perch can be fitted to the door structure. In addition, as noted, the door 58 can be made to open and hinge either in a left or right direction.

Figure 12:
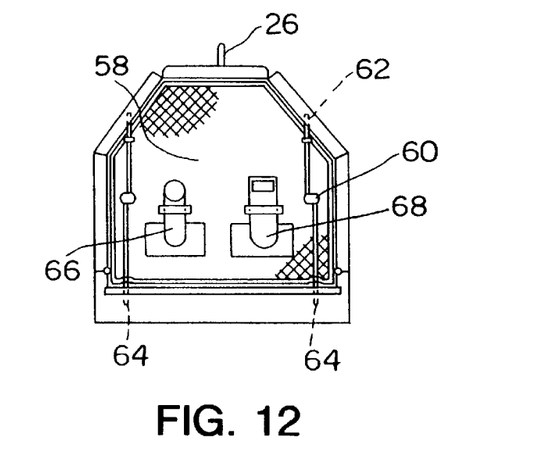
FIG. 12 is yet another front sectional view, illustrating the optional use of food and water dispensers.
Figure 13:
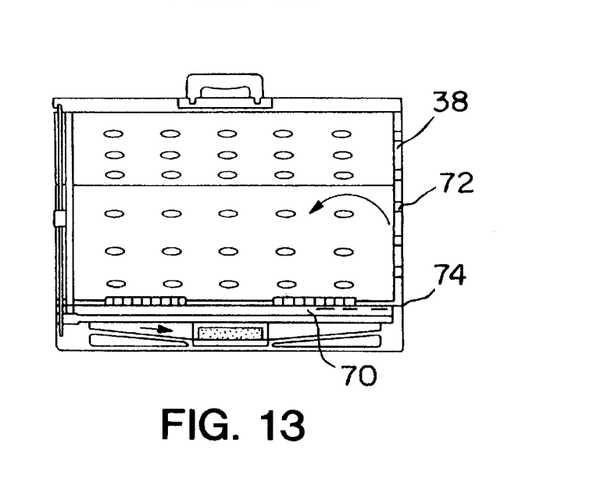
FIG. 13 is a side sectional view of the pet carrier/portable habitat of FIG. 7.

Attention is also directed to FIG. 12, which illustrates the optional use of food and water dispensers 66 and 68 in the door 58. In accordance with the present invention, as the animal can relieve itself without itself having to remain in contact with its liquid waste, the pet owner can more humanely provide the animal with liquid nourishment during prolonged travel periods. Finally, attention is also directed to FIG. 13, which provides a side sectional view of the portable habitat herein. As best shown in FIG. 13, a space is provided at 70 for accommodating the front door 58 when in collapsed configuration. In addition, illustrated end panel 38 which contains holes 72 is itself hinged at 74 for collapsing into the pet habitat.

Alternatively, it should again be appreciated that end panels 22 and 38, while preferably hingedly connected to the portable habitat for folding therein, may optionally be fully releasable for both removal and/or placement within the habitat during shipping and storage.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

What is claimed is:

1. A portable habitat structure for containing a pet comprising:

a bottom panel including a vertically disposed lower section on said bottom panel, said bottom panel containing a floor surface sloped downwardly and inwardly to a recessed section in said floor surface, a perforated tray removably placed within said bottom panel, including a top panel, first and second side panels, a first end panel and a second end panel;

said first end panel and second end panel hingedly attached to said vertically disposed lower section on said bottom panel on said pet habitat to collapse inwardly into said pet habitat and wherein said first and second side panels are hingedly attached to said top and bottom panels;

said first and second side panels each comprising upper and lower sections hingedly connected to one another so as to collapse said first and second side panels inwardly into said habitat;

said perforated removable tray containing openings to allow for passage of liquid onto said sloped surface of said bottom panel, including supports positioned between said tray and said sloped surface of said bottom panel to maintain said tray above said floor surface of said bottom section; wherein said recessed section of said habitat comprises an absorbent pad for the absorption of liquid.

2. The habitat of claim 1, wherein said supports positioned between said tray and said bottom panel comprise ribbed supports projecting upward from said floor surface of said bottom panel, said ribbed supports integral to said bottom panel, said ribbed supports maintaining said perforated removable tray in substantially horizontal position above said inwardly sloped floor surface.

3. The habitat of claim 1, wherein said first end panel comprises a metallic wire door releasably engaged to said habitat to allow for ingress and egress of an animal.

4. The habitat of claim 3 wherein said wire door releasably engage to said habitat can open in either a left or right direction.

5. The habitat of claim 1 wherein said panels comprise twin wall construction.

6. The habitat of claim 4 wherein said twin wall construction is made of plastic.

7. The habitat of claim 1, wherein said top panel contains a folding handle and said top panel further contains a recess for receiving said handle.

8. The habitat of claim 1 wherein said perforated removable tray is made of plastic.

9. The habitat of claim 1 wherein said top panel, first and second side panels, and first and second end panels containing openings for air flow.

\* \* \* \* \*